(12) United States Patent
Oobayashi

(10) Patent No.: US 7,335,694 B2
(45) Date of Patent: Feb. 26, 2008

(54) POLYPROPYLENE RESIN COMPOSITION

(75) Inventor: Yoshiaki Oobayashi, Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 10/361,488

(22) Filed: Feb. 11, 2003

(65) Prior Publication Data
US 2003/0216499 A1    Nov. 20, 2003

(30) Foreign Application Priority Data
Feb. 14, 2002   (JP) .............................. 2002-036393

(51) Int. Cl.
*C08K 5/51* (2006.01)
(52) U.S. Cl. .................. 524/327; 524/323; 524/115; 524/128
(58) Field of Classification Search ................ 524/396, 524/115, 128, 323, 327
See application file for complete search history.

(56) References Cited

U.S. PATENT DOCUMENTS

| | | | |
|---|---|---|---|
| 3,207,739 | A | 9/1965 | Wales |
| 3,929,702 | A | 12/1975 | Miller et al. |
| 4,594,376 | A | 6/1986 | Hamada |
| 4,684,683 | A | 8/1987 | Ficker et al. |
| 5,912,292 | A | 6/1999 | Sun |
| 5,948,839 | A | 9/1999 | Chatterjee |
| 6,562,890 | B2 * | 5/2003 | Dotson ................ 524/396 |
| 6,747,077 | B2 * | 6/2004 | Gugumus et al. ........... 524/100 |
| 6,787,067 | B2 * | 9/2004 | Yukino et al. ......... 252/400.23 |

| | | | |
|---|---|---|---|
| 2001/0041761 | A1 | 11/2001 | Oobayashi et al. |

FOREIGN PATENT DOCUMENTS

| | | |
|---|---|---|
| AU | 11485/88 A | 8/1988 |
| EP | 213788 B | 11/1993 |
| EP | 877039 A | 11/1998 |
| EP | 1266932 A | 12/2002 |
| GB | 955304 | 9/1962 |
| JP | 39-14062 | 7/1964 |
| JP | 40-1652 | 1/1965 |
| JP | 63-125551 A | 5/1988 |
| WO | WO 2000/014150 A | 3/2000 |
| WO | WO 2002/044260 A | 6/2002 |

OTHER PUBLICATIONS

English translation of JP 07-173340 A published Jul. 11, 1995 (Yokuyama Corp.).
English Abstract of JP 54-069155 published Jun. 2, 1979 (Showa Denko KK et al.).
English Abstract of JP 58-080329 published May 14, 1983 (Mitsui Toatsu Chem Inc.).

* cited by examiner

*Primary Examiner*—Peter D. Mulcahy
(74) *Attorney, Agent, or Firm*—Sughrue Mion, PLLC

(57) ABSTRACT

Disclosed is a polypropylene resin composition comprising (A) 100 parts by weight of polypropylene resin and the following components (B) to (D):
(B) from 0.001 to 0.1 part by weight of an inorganic neutralizing agent,
(C) from 0.01 to 5 parts by weight of an antioxidant, and
(D) from 0.01 to 0.5 part by weight of particles of sodium benzoate having an average particle diameter, as measured by a laser method, of from 0.1 to 3.75 μm wherein particles having particle diameters of not less than 10 μm account for less than 15% by weight.

4 Claims, 1 Drawing Sheet

POLYPROPYLENE RESIN COMPOSITION

BACKGROUND OF THE INVENTION

1. Field of the Invention

The present invention relates to a polypropylene resin composition and to a formed article comprising the same. In particular, the invention relates to a polypropylene resin composition superior in rigidity and impact resistance and also superior in thermal aging resistance and to a formed article comprising the same.

2. Description of the Related Art

Polypropylene resins are widely used in a wide variety of applications such as automotive interior or exterior materials, materials for home electrical products, containers and convenience goods because they are materials superior in mechanical properties such as rigidity and impact resistance. One of known approaches for improving mechanical properties of polypropylene resins is blending of a nucleating agent.

For example, Plastic Databook (§9.7 "Nucleating Agent" pp. 978–980, published by Kogyo Chosakai Publishing Co., Ltd.) discloses nucleating agents. For example, disclosed are nucleating agents such as inorganic nucleating agents, e.g. talc, and metal salt type nucleating agents, e.g. metal salts of carboxylic acids and phosphate type metal salts. In addition, the book discloses injection moldings of polypropylene containing such a nucleating agent as well.

JP,A 63-125551 discloses, as a propylene polymer composition which does not corrode metal molds to damage it and which has improved rigidity and transparency, a propylene polymer composition comprising 100 parts by weight of a propylene polymer containing Mg and halogen as a polymerization catalyst residue, from 0.03 to 0.5 part by weight of an aluminum salt of p-tert-butylbenzoic acid and from 0.01 to 0.5 part by weight of at least one kind of substance selected from salts made up of a metal of Group I of the periodic table or zinc with a higher aliphatic carboxylic acid and hydrotalcites.

However, formed articles of the polypropylene resin containing a nucleating agent disclosed in the above-cited reference may be deteriorated with respect to impact resistance evaluated by falling weight impact strength and the like even if they have improved rigidities. Therefore, improvement in balance between rigidity and impact resistance has been awaited.

Furthermore, since polypropylene resins may be used under conditions of high temperatures not higher than their melting points for a long period of time, materials mechanical characteristics of which no not deteriorate very much during their long time use, in other words, materials superior in thermal aging resistance in their long time use have been awaited.

SUMMARY OF THE INVENTION

The object of the present invention is to provide a polypropylene resin composition superior in balance between rigidity and impact resistance and also superior in thermal aging resistance in its long time use.

The present inventors investigated diligently and found that a resin composition obtained by blending particles of sodium benzoate satisfying specific requirements concerning particle size as well as an inorganic neutralizing agent and an antioxidant to a polypropylene resin is superior in a balance between rigidity and impact resistance and also superior in thermal aging resistance in its long time use. Thus, they accomplished the present invention.

That is, the present invention relates to a polypropylene resin composition comprising (A) 100 parts by weight of a polypropylene resin and the following components (B) to (D):

(B) from 0.001 to 0.1 part by weight of an inorganic neutralizing agent, (C) from 0.01 to 5 parts by weight of an antioxidant, and (D) from 0.01 to 0.5 part by weight of particles of sodium benzoate having an average particle diameter, as measured by a laser method, of from 0.1 to 3.75 μm wherein particles having particle diameters of not less than 10 μm account for less than 15% by weight.

Moreover, the present invention relates to a formed article comprising the above-mentioned polypropylene resin composition.

DESCRIPTION OF PREFERRED EMBODIMENTS

Figure 1:
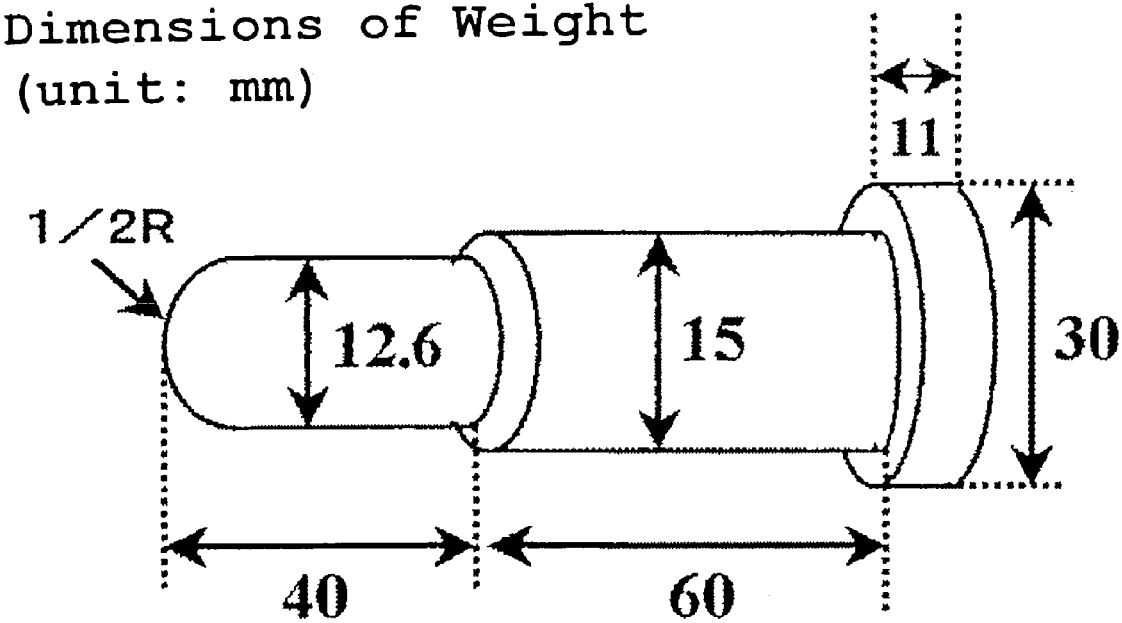
FIG. 1 shows the shape of a weight to be used for measurement of impact resistance.

Examples of the polypropylene resin (A) used in the present invention include propylene homopolymers, propylene-ethylene random copolymers, propylene-α-olefin random copolymers, propylene-ethylene-α-olefin copolymers, and polypropylene copolymers comprising a propylene homopolymer component or a copolymer component mainly comprising propylene (henceforth referred to as polymer component (I)) and a copolymer component of propylene with ethylene and/or α-olefin (henceforth referred to as copolymer component (II)). These polypropylene resins may be used alone or as a blend of two or more of them.

The α-olefin is not particularly restricted and is preferably an α-olefin having from 4 to 12 carbon atoms, examples of which include 1-butene, 1-pentene, 1-hexene, 4-methyl-1-pentene, 1-octene and 1-decene. More preferred are 1-butene, 1-hexene and 1-octene.

Examples of the propylene-α-olefin random copolymers include propylene-1-butene random copolymers, propylene-1-hexene random copolymers, and propylene-1-octene random copolymers.

Examples of the propylene-ethylene-α-olefin copolymers include propylene-ethylene-1-butene copolymers, propylene-ethylene-1-hexene copolymers, and propylene-ethylene-1-octene copolymers.

Examples of the copolymer component mainly comprising propylene in the polymer component (I) include a propylene-ethylene copolymer component, a propylene-1-butene copolymer component and a propylene-1-hexene copolymer component. Examples of the copolymer component of propylene with ethylene and/or α-olefin include a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component and a propylene-1-octene copolymer component.

The content of ethylene and/or α-olefin having from 4 to 12 carbon atoms in the copolymer component (II) is not particularly restricted, but is usually from 0.01 to 20% by weight.

Examples of the polypropylene copolymer comprising the polymer component (I) and the copolymer component (II) include (propylene)-(propylene-ethylene) copolymers, (propylene)-(propylene-ethylene-1-butene) copolymers, (propylene)-(propylene-ethylene-1-hexene) copolymers, (propylene)-(propylene-1-butene) copolymers, (propylene)-(propylene-1-hexene) copolymers, (propylene-ethylene)-(propylene-ethylene) copolymers, (propylene-ethylene)-(propylene-ethylene-1-butene) copolymer, (propylene-ethylene)-(propylene-ethylene-1-hexene) copolymers, (propylene-ethylene)-(propylene-1-butene) copolymers, (propylene-ethylene)-(propylene-1-hexene) copolymers, (propylene-1-butene)-(propylene-ethylene) copolymers, (propylene-1-butene)-(propylene-ethylene-1-butene) copolymers, (propylene-1-butene)-(propylene-ethylene-1-hexene) copolymers, (propylene-1-butene)-(propylene-1-butene) copolymers, and (propylene-1-butene)-(propylene-1-hexene) copolymers.

The polypropylene resin (A) used in the present invention is preferably a polypropylene copolymer comprising the polymer component (I) and the copolymer component (II), and more preferably the polypropylene copolymer wherein the copolymer component (II) is a copolymer component made up of propylene and ethylene and/or α-olefin having from 4 to 12 carbon atoms.

More preferable is a polypropylene copolymer wherein the copolymer component (II) is a copolymer component made up of propylene and ethylene and the proportion of the copolymer component is from 5 to 40% by weight based on the whole polypropylene copolymer and wherein the ethylene content in the copolymer component is from 10 to 70% by weight.

The crystallinity of the polypropylene resin (A) used in the present invention is not particularly restricted, but polypropylene resins with high crystallinities are preferable from the viewpoint of rigidity. Preferable polypropylene resins with high crystallinities are those wherein the fraction of the propylene monomer units existing at the centers of the chains in which five propylene monomer units are successively meso-bonded to the pentad units in the polypropylene molecule is not less than 0.95, the fraction being determined by the method reported by A. Zambelli et al. in Macromolecules, 6, 925 (1973). The fraction is called an isotactic pentad fraction and is represented by [mmmm].

The method for producing the polypropylene resin (A) used in the present invention is not particularly restricted. The resin can be produced by a known polymerization method using a known polymerization catalyst. Examples of the polymerization catalyst include Ziegler type catalysts, Ziegler-Natta type catalysts, catalyst systems comprising a compound of a transition metal of Group IV of the periodic table having a cyclopentadienyl ring and alkylaluminoxane, and catalyst systems comprising a compound of a transition metal of Group IV of the periodic table having a cyclopentadienyl ring, a compound capable of reacting with the foregoing compound to form an ionic complex and an organoaluminum compound.

Examples of the polymerization method include slurry polymerization and solvent polymerization using an inert hydrocarbon solvent, liquid phase polymerization and gas phase polymerization using no solvent, or liquid phase-gas phase polymerization in which the foregoing methods are performed successively. These polymerization methods may be in a batch mode or in a continuous mode. The polymerization method may be a method in which the polypropylene resin (A) is produced in one stage or may be a method in which it is produced in multiple stages comprising two or more stages. In particular, the method for producing a polypropylene resin composition comprising the polymer component (I) and the copolymer component (II) is preferably a production method comprising multiple (two or more) stages comprising a stage of producing the polymer component (I) and a stage of producing the copolymer component (II). When the polymer component (I) and the polymer component (II) are produced in multiple stages, it is preferable that the polymerization of the polymer component (II) be carried out in the presence of the polymer component (I) produced in a prior stage.

In the production of the polypropylene (A) used in present invention, the polypropylene resin (A) may, as required, be dried at a temperature equal to or lower than the temperature at which the resin (A) melts in order to remove a residual solvent contained in the polypropylene resin (A) or oligomers with ultra low molecular weights produced during the production. Examples of the drying method include those described in JP,A 55-75410 and the specification of Japanese Patent No. 2565753.

The melt flow rate (MFR) of polypropylene resin (A) used in the present as measured at 230° C. is usually within the range of from 0.01 to 200 g/10 minutes, preferably from 1 to 100 g/10 minutes, and more preferably from 0.1 to 50 g/10 minutes.

As the inorganic neutralizing agent (B) used in the present invention, known one can be used. Examples thereof include hydrotalcites, oxides or hydroxides of alkaline earth metals, and the like. Preferred are hydrotalcites and oxides or hydroxides of alkaline earth metals. Hydrotalcites are more preferable. These neutralizing agents may be used alone or in combination of two or more of them.

Hydrotalcite is a anion-exchangeable layered compound represented by the following formula (I):

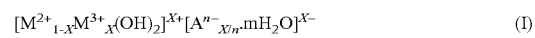
$$[M^{2+}_{1-X}M^{3+}_{X}(OH)_2]^{X+}[A^{n-}_{X/n} \cdot mH_2O]^{X-} \quad (I)$$

In the formula, $[M^{2+}_{1-X}M^{3+}_{X}(OH)_2]^{X+}$ forms a elementary layer and $[A^{n-}_{X/n} \cdot mH_2O]^{X-}$ forms an intermediate layer. $M^{2+}$ is a divalent metal cation, e.g. $Mg^{2+}$, $Mn^{2+}$, $Fe^{2+}$, $Co^{2+}$, $Ni^{2+}$, $Cu^{2+}$ and $Zn^{2+}$. $M^{3+}$ is a trivalent metal cation, e.g. $Al^{3+}$, $Fe^{3+}$, $Cr^{3+}$, $Co^{3+}$ and $In^{3+}$. $A^{n-}$ is an n-valent anion, e.g. $OH^-$, $F^-$, $Cl^-$, $Br^-$, $NO_3^-$, $CO_3^{2-}$, $SO_4^{2-}$, $Fe(CN)_6^{3-}$, $CH_3COO^-$, oxalate ion and salicylate ion, and n is a positive integer. X satisfies $0 < X \leq 0.33$, and m is a positive number.

The hydrotalcite may be a naturally occurring mineral or a synthetic product. It is not particularly restricted with respect to crystal structure, crystal particle diameter, water content, and the like. As required, surface treatment may be applied to the hydrotalcite.

Of the hydrotalcites represented by the foregoing formula, preferred is a hydrotalcite represented by the following formula (II):

$$Mg_YAl_2(OH)_{2Y+4}CO_3 \cdot mH_2O \quad (II)$$

wherein Y satisfies $Y \geq 4$ and m is a positive number.

More preferable are those wherein $M^{2+}$ in formula (II) is constituted of one kind or two kinds of divalent cation selected from $Mg^{2+}$ and $Zn^{2+}$. Particularly preferred are the following hydrotalcites:

$$Mg_{4.5}Al_2(OH)_{13}CO_3 \cdot 3H_2O$$

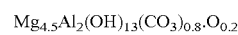
$$Mg_{4.5}Al_2(OH)_{13}(CO_3)_{0.8} \cdot O_{0.2}$$

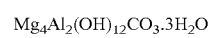
$$Mg_4Al_2(OH)_{12}CO_3 \cdot 3H_2O$$

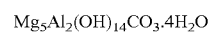
$$Mg_5Al_2(OH)_{14}CO_3 \cdot 4H_2O$$

Mg$_6$Al$_2$(OH)$_{16}$CO$_3$.4H$_2$O (naturally occurring mineral)

Zn$_4$Al$_2$(OH)$_{12}$CO$_3$.mH$_2$O (m=0–4)

Mg$_3$ZnAl$_2$(OH)$_{12}$CO$_3$.mH$_2$O (m=0–4)

The oxides or hydroxides of alkaline earth metals are oxides or hydroxides of metal atoms of Group II of the periodic table, examples of which include calcium oxide, magnesium oxide, calcium hydroxide and magnesium hydroxide. Preferred is calcium hydroxide.

The inorganic neutralizing agent (B) used in the present invention is not particularly restricted, but those with superior dispersibility are used preferably. The average particle diameter thereof is not particularly restricted, but is preferably from 0.01 to 10 μm, more preferably from 0.01 to 5 μm, and still more preferably from 0.01 to 1 μm. When the average particle diameter is over 10 μm, the impact resistance may deteriorate.

The amount of the inorganic neutralizing agent (B) blended in the present invention is from 0.001 to 0.1 part by weight, preferably from 0.001 to 0.05 part by weight, more preferably from 0.005 to 0.03 part by weight, based on 100 parts by weight of the polypropylene resin.

When the amount of the inorganic neutralizing agent (B) blended is less than 0.001 part by weight, deactivation of a catalyst residue may be performed insufficiently, resulting in insufficient anticorrosion property to processing devices (inhibition of rusting). When over 0.1 part by weight, formed articles may discolor. Even if a formed article does not discolor, the effect of the present invention will be saturated, resulting only in poor economy.

The antioxidant (C) used in the present invention is not particularly restricted and those which have been known may be used. Antioxidants are compounds having an activity to prevent polypropylene resins from being decomposed due to heat, light, oxygen, and the like. Examples thereof include phenol antioxidants, phosphorus antioxidants, sulfur antioxidants, hydroxylamine antioxidants, hindered amine light stabilizers, and metal deactivators.

Preferred are phenol antioxidants, phosphorus antioxidants, and sulfur antioxidants. More preferred are antioxidants comprising a combination of at least one antioxidant selected from phosphorus antioxidants and sulfur antioxidants and at least one phenol antioxidant.

Examples of phenol antioxidants are as follows:

(1) Alkylated Monophenol

Examples: 2,6-Di-tert-butyl-4-methylphenol, 2,4,6-tri-tert-butylphenol, 2,6-di-tert-butylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl-6-(1'-methylundecyl-1'-yl)phenol, 2,4-dimethyl-6-(1'-methylheptadecyl-1'-yl)phenol, 2,4-dimethyl-6-(1'-methyltridecyl-1'-yl)phenol, and mixtures thereof.

(2) Alkylthiomethylphenol

Examples: 2,4-Dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol, and mixtures thereof.

(3) Hydroquinone and Alkylated Hydroquinone

Examples: 2,6-Di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyphenyl stearate, bis(3,5-di-tert-butyl-4-hydroxyphenyl)adipate, and mixtures thereof.

(4) Tocopherol

Examples: α-Tocopherol, β-tocopherol, γ-tocopherol, δ-tocopherol and mixtures thereof.

(5) Hydroxylated Thiodiphenyl Ether

Examples: 2,2'-Thiobis(6-tert-butylphenol), 2,2'-thiobis(4-methyl-6-tert-butylphenol), 2,2'-thiobis(4-octylphenol), 4,4'-thiobis(3-methyl-6-tert-butylphenol), 4,4'-thiobis(2-methyl-6-tert-butylphenol), 4,4'-thiobis(3,6-di-tert-amylphenol), and 4,4'-(2,6-dimethyl-4-hydroxyphenyl)disulfide.

(6) Alkylidene Bisphenol and Derivative Thereof

Examples: 2,2'-Methylenebis(4-methyl-6-tert-butylphenol), 2,2'-methylenebis(4-ethyl-6-tert-butylphenol), 2,2'-methylenebis[4-methyl-6-(α-methylcyclohexyl)phenol]], 2,2'-methylenebis(4-methyl-6-cyclohexylphenol), 2,2'-methylenebis(4-methyl-6-nonylphenol), 2,2'-methylenebis(4,6-di-tert-butylphenol), 2,2'-ethylidenebis(4,6-di-tert-butylphenol), 2,2'-ethylidenebis(4-isobutyl-6-tert-butylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(6-tert-butyl-2-methylphenol), 4,4'-methylenebis(2,6-di-tert-butylphenol), 4,4'-butylidenebis(3-methyl-6-tert-butylphenol), 1,1-bis(4-hydroxyphenyl)cyclohexane, 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis-3'-tert-butyl-4'-hydroxyphenyl]butylate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane, 2-tert-butyl-6-(3'-tert-butyl-5'-methyl-2'-hydroxybenzyl)-4-methylphenyl acrylate, 2,4-di-tert-pentyl-6-[1-(2-hydroxy-3,5-di-tert-pentylphenyl)ethyl]phenyl acrylate, and mixtures thereof.

(7) O-, N- or S-Benzyl Derivative

Examples: 3,5,3',5'-Tetra-tert-butyl-4,4'-dihydroxydibenzyl ether, octadecyl-4-hydroxy-3,5-dimethylbenzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl mercaptoacetate, and mixtures thereof.

(8) Hydroxybenzylated Malonate Derivative

Examples: Dioctadecyl-2,2-bis(3,5-di-tert-butyl-2-hydroxybenzyl)malonate, dioctadecyl-2-(3-tert-butyl-4-hydroxy-5-methylbenzyl) malonate, didodecylmercapto ethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, and mixtures thereof.

(9) Examples of Aromatic Hydroxybenzyl Derivative
1,3,5-Trimethyl-2,4,6-tris(3,5-di-tert-butyl-4-hydroxybenzyl)benzene, 1,4-bis(3,5-di-tert-butyl-4-hydroxybenzyl)-2,3,5,6-tetramethylbenzene, 2,4,6-tris(3,5-tert-butyl-4-hydroxybenzyl)phenol, and mixtures thereof.

(10) Triazine Derivative
Examples: 2,4-Bis(n-octylthio)-6-(4-hydroxy-3,5-di-tert-butylanilino)-1,3,5-triazine, 2-n-octylthio-4,6-bis(4-hydroxy-3,5-di-tert-butylanilino)-1,3,5-triazine, 2-n-octylthio-4,6-bis(4-hydroxy-3,5-di-tert-butylphenoxy)-1,3,5-triazine, 2,4,6-tris(3,5-di-tert-butyl-4-phenoxy)-1,3,5-triazine, tris(4-tert-butyl-3-hydroxy-2,6-dimethylbenzyl)isocyanurate, tris(3,5-di-tert-butyl-4-hydroxybenzyl)isocyanurate, 2,4,6-tris(3,5-di-tert-butyl-4-hydroxyphenylethyl)-1,3,5-triazine, 2,4,6-tris(3,5-di-tert-butyl-4-hydroxyphenylpropyl)-1,3,5-triazine, tris(3,5-dicyclohexyl-4-hydroxybenzyl)isocyanurate, tris[2-(3',5'-di-tert-butyl-4'-hydroxycinnamoyloxy)ethyl]isocyanurate, and mixtures thereof.

(11) Benzyl Phosphonate Derivative
Examples: Dimethyl-3,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of 3,5-di-tert-butyl-4-hydroxybenzylphosphonic acid monoester, and mixtures thereof.

(12) Acylaminophenol Derivative
Examples: 4-Hydroxylauric acid anilide, 4-hydroxystearic acid anilide, octyl-N-(3,5-di-tert-butyl-4-hydroxyphenyl)carbanate, and mixtures thereof.

(13) Esters of β-(3,5-di-tert-butyl-4-hydroxyphenyl)propionic Acid and Mono- or Polyhydric Alcohols, Examples of which are Shown Below.
Methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane, and mixtures thereof.

(14) Esters of β-(5-tert-butyl-4-hydroxy-3-methylphenyl)propionic Acid and Mono- or Polyhydric Alcohols, Examples of which are Shown Below.
Methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxy methyl-1-phospha-2,6,7-trioxabicyclo[2,2,2]octane, and mixtures thereof.

(15) Esters of β-(3,5-dicyclohexyl-4-hydroxyphenyl)propionic Acid and Mono- or Polyhydric Alcohol, Examples of which are Shown Below.
Methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane, and mixtures thereof.

(16) Esters of 3,5-di-tert-butyl-4-hydroxyphenylacetic Acid and Mono- or Polyhydric Alcohol, Examples of which are Shown Below.
Methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane, and mixtures thereof.

(17) Amide of β-(3,5-di-tert-butyl-4-hydroxyphenyl)propionic Acid
Examples: N,N'-Bis[3-(3',5'-di-tert-butyl-4'-hydroxyphenyl)propionyl]hydrazine, N,N'-bis[3-(3',5'-di-tert-butyl-4'-hydroxyphenyl)propionyl]hexamethylenediamine, N,N'-bis[3-(3',5'-di-tert-butyl-4'-hydroxyphenyl)propionyl]trimethylenediamine, and mixtures thereof.

Examples of phosphorus antioxidants include triphenyl phosphite, tris(nonylphenyl)phosphite, tris(2,4-di-tert-butylphenyl)phosphite, trilauryl phosphite, trioctadecylphosphite, distearylpentaerythritol diphosphite, diisodecylpentaerythritol diphosphite, bis(2,4-di-tert-butylphenyl)pentaerythritol diphosphite, bis(2,4-dicumylphenyl)pentaerythritol diphosphite, bis(2,4-di-tert-butyl-6-methylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, tristearylsorbitol triphosphite, tetrakis(2,4-di-tert-butylphenyl)-4,4'-diphenylene diphosphonite, 2,2'-methylenebis(4,6-di-tert-butylphenyl)2-ethylhexyl phosphite, 2,2'-ethylidenebis(4,6-di-tert-butylphenyl)fluorophosphite, bis(2,4-di-tert-butyl-6-methylphenyl)ethyl phosphite, bis(2,4-di-tert-butyl-6-methylphenyl)methyl phosphite, 2-(2,4,6-tri-tert-butylphenyl)-5-ethyl-5-butyl-1,3,2-oxaphosphorinane, 2,2',2"-nitrilo[triethyl-tris(3,3',5,5'-tetra-tert-butyl-1,1'-biphenyl-2,2'-diyl)phosphite, and mixtures thereof.

Examples of sulfur antioxidants include dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayl tetrakis(3-laurylthiopropionate), and bis[2-methyl-4-(3-n-alkyl($C_{12-14}$)thiopropionyloxy)-5-tert-butylphenyl]sulfide.

Examples of particularly preferable phenol antioxidants include those described below. Two or more of them may be used.
2,6-di-tert-butyl-4-methylphenol, 2,4,6-tri-tert-butylphenol, 2,4-dioctylthiomethyl-6-methylphenol, 2,2'-thiobis(6-tert-butylphenol), 4,4'-thiobis(3-methyl-6-tert-butylphenol), 2,2'-methylenebis(4-methyl-6-tert-butylphenol), 2,2'-methylenebis(4-ethyl-6-tert-butylphenol), 2,2'-methylenebis[4-methyl-6-(α-methylcyclohexyl)phenol]], 2,2'-methylenebis(4-methyl-6-cyclohexylphenol), 2,2'-methylenebis(4,6-di-tert-butylphenol), 2,2'-ethylidenebis(4,6-di-tert-butylphenol), 4,4'-methylenebis(6-tert-butyl-2-methylphenol), 4,4'-methylenebis(2,6-di-tert-butylphenol), 4,4'-butylidenebis(3-methyl-6-tert-butylphenol), 1,1-bis(4-hydroxyphenyl)cyclohexane, 1,1-bis(5-tert-butyl-4-hydroxy-2-methylphenyl)butane, 1,1,3-tris(5-tert-butyl-4-hydroxy-2-methylphenyl)butane, ethylene glycol bis[3,3-bis-3'-tert-butyl-4'-hydroxyphenyl]butyrate], 2-tert-butyl-6-(3'-tert-butyl-5'-methyl-2'-hydroxybenzyl)-4-methylphenyl acrylate, 2,4-di-tert-pentyl-6-[1-(2-hydroxy-3,5-di-tert-pentylphenyl)ethyl]phenyl acrylate, 2,4,6-tris(3,5-di-tert-butyl-4-phenoxy)-1,3,5-triazine, tris(4-tert-butyl-3-hydroxy-2,6- dimethylbenzyl) isocyanurate, bis(3,5-di-tert-butyl-4-hydroxybenzyl) isocyanurate, tris[2-(3',5'-di-tert-butyl-4'-hydroxycinnamoyloxy)ethyl]isocyanurate, diethyl-3,5-di-tert-butyl-4-hydroxybenzyl phosphonate, di-n-octadecyl-3,5-di-tert-butyl-4-hydroxybenzyl phosphonate, calcium salt of 3,5-di-tert-butyl-4-hydroxybenzyl phosphonic acid monoester, n-octadecyl 3-(3,5-di-tert-butyl-4-hydroxyphenyl)propionate, neopentanetetrayl tetrakis(3,5-di-tert-butyl-4-hydroxycinnamate), thiodiethylenebis(3,5-di-tert-butyl-4-hydroxycinnamate), 1,3,5-trimethyl-2,4,6-tris(3,5-di-tert-butyl-4-hydroxybenzyl)benzene, 3,6-dioxaoctamethylenebis(3,5-di-tert-butyl-4-hydroxycinnamate), hexamethylenebis(3,5-di-tert-butyl-4-hydroxycinnamate), triethylene glycol bis(5-tert-tyl-4-hydroxy-3-methylcinnamate), 3,9-bis[2-(3-(3-tert-butyl-4-hydroxy-5-methylphenyl)propionyloxy)-1,1-dimethylethyl]-2,4,8,10-tetraoxaspiro[5.5]undecane, N,N'-bis[3-(3',5'-di-tert-butyl-4'-hydroxyphenyl)propionyl]hydrazine, and N,N'-bis[3-(3',5'-di-tert-butyl-4'-hydroxyphenyl)propionyl]hexamethylenediamine.

Examples of particularly preferable phosphorus antioxidants include those described below. Two or more of them may be used.

Tris(nonylphenyl)phosphite, tris(2,4-di-tert-butylphenyl) phosphite, distearylpentaerythritol diphosphite, bis(2,4-di-tert-butylphenyl)pentaerythritol diphosphite, bis(2,4-di-tert-butyl-6-methylphenyl)pentaerythritol diphosphite, bis(2,6-di-tert-butyl-4-methylphenyl)pentaerythritol diphosphite, bis(2,4-dicumylphenyl)pentaerythritol diphosphite, tetrakis(2,4-di-tert-butylphenyl)-4,4'-diphenylene diphosphonite, 2,2'-methylenebis(4,6-di-tert-butylphenyl)2-ethylhexyl phosphite, 2,2'-ethylidenebis(4,6-di-tert-butylphenyl)fluorophosphite, bis(2,4-di-tert-butyl-6-methylphenyl)ethyl phosphite, 2-(2,4,6-tri-tert-butylphenyl)-5-ethyl-5-butyl-1,3,2-oxaphosphorinane, and 2,2',2''-nitrilo[triethyl-tris(3,3',5,5'-tetra-tert-butyl-1,1'-biphenyl-2,2'-diyl)phosphite.

The amount of the antioxidant (C) blended in the present invention is from 0.01 to 5 parts by weight, preferably from 0.03 to 1 part by weight, more preferably from 0.05 to 0.5 part by weight, based on 100 parts by weight of polypropylene resin (A). When the amount of the antioxidant (C) blended is less than 0.01 part by weight, rigidity, impact resistance and thermal aging resistance may be insufficient, whereas when over 5 parts by weight, formed articles may be insufficient in appearance e.g. hue and luster.

The sodium benzoate particles (D) used in the present invention has an average particle diameter, as measured by a laser method, of from 0.1 to 3.75 μm wherein particles having particle diameters of not less than 10 μm account for less than 15% by weight. When the average particle diameter is less than 0.1 μm, the particles may have insufficient dispersibility in a polypropylene powder or may result in insufficient improvement of rigidity. When the average particle diameter is over 3.75 μm or when the proportion of the particles having particle diameters of 10 μm or more is 15% by weight or more, the impact resistance may deteriorate.

The amount of the sodium benzoate particles (D) blended in the present invention is from 0.01 to 0.5 parts by weight, preferably from 0.01 to 0.3 part by weight, more preferably from 0.05 to 0.3 part by weight, based on 100 parts by weight of polypropylene resin (A). When the amount is less than 0.01 part by weight, improvement of rigidity maybe insufficient, whereas when it is over 0.5 part by weight, the impact resistance may deteriorate.

To the polypropylene resin composition of the present invention, other additives may be added, as required. Examples of such additives include ultraviolet absorbers, plasticizers, flame retardants, nucleating agents, antistatic agents, pigments, anti-blocking agents, surfactants, lubricants, processing aids, foaming agents, organic peroxides, inorganic fillers, glass fibers, or auxiliary stabilizers such as benzofurans and indolinones described in specifications of U.S. Pat. Nos. 4,325,853, 4,338,244, 5,175,312, 5,216,053, 5,252,643 and 4,316,611, specifications of German Patent Nos. DE-A-4,316,622 and DE-A-4,316,876, and specifications of Europe Patent Nos. EP-A-589,839 and EP-A-591,102.

The blending of these additives is not particularly restricted. For example, they may be blended into pellets of a polypropylene resin composition which has been melt kneaded in advance, or may be blended with other ingredients when the polypropylene resin composition is pelletized.

To the polypropylene resin composition of the present invention, resins other than the polypropylene resin used in the present invention may also be blended, as required. Examples thereof include polyethylene resins, copolymer rubbers of ethylene and α-olefin, petroleum resins, and styrene-based copolymer rubbers obtained by hydrogenating styrene-butadiene-styrene copolymers, styrene-isoprene-styrene copolymers, or the like.

The method for pelletizing the polypropylene resin composition of the present invention may be a method comprising blending the inorganic neutralizing agent (B), the antioxidant (C), the sodium benzoate particles (D) and, as required, other additives to the polypropylene resin (A), melt kneading them, and pelletizing. For example, used is a method comprising melt kneading the ingredients in the presence of an organic peroxide and pelletizing by use of a melt extruder, a Banbury mixer, or the like.

The method for blending the sodium benzoate particles (D) used in the polypropylene resin composition of the present invention may be a method comprising preparing in advance a high-concentration pellets of the particles (D) produced by melt kneading the polypropylene resin (A) and the sodium benzoate particles (D) used in the present invention so that the concentration of the sodium benzoate particles (D) becomes from 1 to 50% by weight, and then melt kneading the high-concentration pellets with additional polypropylene resin (A) to dilute.

The method for blending the sodium benzoate particles (D) may be a method in which the blending is performed by mixing the inorganic neutralizing agent (B), the antioxidant (C) or at least one other additive and the sodium benzoate particles (D) so that the concentration of the sodium benzoate particles (D) become from 10 to 90% by weight to prepare in advance a material solidified in a granular form, and then melt kneading it with the polypropylene resin (A) used in the present invention.

The formed article of the present invention is a product obtained by forming the polypropylene resin composition of the present invention by a method selected from various kinds of forming methods and is not particularly limited with respect to the shape, size and the like.

Examples of the method for producing the formed article of the present invention include injection molding, press molding, vacuum forming, foam molding and extrusion forming, which are usually used in industry. Depending upon purposes, a forming method in which the polypropylene resin composition of the present invention and a similar type of polyolefin resin or other resin are laminated, a co-extrusion forming, and the like may be employed.

Particularly preferred as the formed article of the present invention are injection moldings.

Examples of the applications of the formed article of the present invention include automotive supplies, home electrical supplies, OA equipment/media-related supplies, building materials, drain pans, toiletry supplies, bottles, containers, and sheets. Examples of automotive supplies include interior components such as door trims, pillars and instrument panels, exterior components such as bumpers, and the like. Examples of home electrical supplies include components of washers, components of vacuum cleaners, components of rice cookers, and the like. Examples of OA equipment/media-related supplies include cases of magnetic recording mediums and optical recording mediums, parts of personal computers, parts of printers, and tanks for preservation of ink. Examples of containers and sheet materials include containers for food packaging, containers for transportation of beer or the like, and stationery materials. The drain pans may be drain pans for washers. Examples of toiletry supplies include seats, seat covers, inner tanks and outer tanks.

EXAMPLES

The present invention will be described by reference to examples and comparative examples. However, the invention is not restricted to these examples.

The polypropylene resins and additives used in the examples and comparative examples are listed below.

(1) Polyolefin Resin (Component A)

A polyolefin resin was produced by gas phase polymerization under conditions such that a polypropylene resin having the physical properties shown below using a catalyst obtained according to the method described in Example 5 disclosed in the specification of Japanese Patent No. 2950168.

(A-1) Propylene-(ethylene-propylene)copolymer

MI (230° C.): 9 g/10 minutes

Stereoregularity ([mmmm]): 0.97

Content of ethylene-propylene random copolymer component: 14% by weight

Content of ethylene in ethylene-propylene random copolymer component: 45% by weight (2) Inorganic Neutralizing Agent (Component B)

(B-1) Hydrotalcite DHT4C (Available from Kyowa Chemical Industry Co., Ltd.)

Chemical formula: $Mg_{4.5}Al_2(OH)_{13}(CO_3)_{0.8} \cdot O_{0.2}$

Loss on heating (% by weight), which is the depletion of water, at each temperature Loss of heating at 100° C.: 0.6% by weight Loss of heating at 200° C.: 1.2% by weight Loss of heating at 300° C.: 5.1% by weight (B-2) Calcium stearate: Calcium Stearate S (available from NOF Corporation)

(3) Antioxidant (Component C)

(C-1)

3,9-Bis[2-(3-(3-tert-butyl-4-hydroxy-5-methylphenyl)propionyloxy)-1,1-dimethylethyl]-2,4,8,10-tetraoxaspiro[5.5]undecane (Sumilizer GA80 available from Sumitomo Chemical Co., Ltd.)

(C-2)

Bis(2,4-di-tert-butylphenyl)pentaerythritol diphosphite (ULTRANOX 626 available from GE Specialty Chemicals)

(C-3)

Dimyristyl 3,3'-thiodipropionate (Sumilizer TPM available from Sumitomo Chemical Co., Ltd.)

(4) Sodium Benzoate Particles (Component D)

Measurement of particle diameter was carried out using a laser diffraction particle size analyzer (SALD2000J available from Shimadzu Corporation)

(D-1) Sodium benzoate (20M): available from Ciba Specialty Chemicals, average particle diameter: 3.64 μm, proportion of particles having particle diameters of 10 μm or more: 10%

(D-2) Sodium benzoate (40M): available from Ciba Specialty Chemicals, average particle diameter: 3.65 μm, proportion of particles having particle diameters of 10 μm or more: 14%

(D-3) Sodium benzoate: available from Mallinckrodt Inc., average particle diameter: 3.86 μm, proportion of particles having particle diameters of 10 μm or more: 17%

(5) Nucleating Agent (E-1) Hydroxy-di(para-tert-butylbenzoic acid) aluminium: available from KYODO CHEMICAL CO.,LTD., average particle diameter: 8.1 μm, proportion of particles having particle diameters of 10 μm or more: 40%

Physical properties of polypropylene resin compositions were measured according to the following methods.

(1) Melt Flow Rate (MFR, Unit: g/10 Minutes)

Melt flow rate was measured at 230° C. according to JIS K7210.

(2) Content of Propylene-ethylene Random Copolymer Component (Unit: % by Weight) and Content of Ethylene-propylene Random Copolymer Component (Unit: % by Weight)

The contents were determined from $^{13}$C-NMR spectrum measured under the following conditions based on the report by Kakugo et al., (Macromolecules 1982, 15, 1150–1152).

A sample was prepared by homogeneously dissolving about 200 mg of a propylene-ethylene block copolymer in 3 ml of a mixed solvent (orthodichlorobenzene/deuterated orthodichlorobenzene=4/1 (volume ratio)) in a 10-mm φ test tube. Then, the $^{13}$C-NMR spectrum of the sample was determined under the following conditions. Measurement was carried out by use of JNM-EX270 available from JEOL Ltd.

Measuring temperature: 135° C.

Pulse repeating time: 10 seconds

Pulse width: 45°

Integrating times: 2500

(3) Stereoregularity ([mmmm])

The isotactic pentad fraction is the fraction of propylene monomer unit existing at the center of the isotactic chain in the form of a pentad unit, in other words, the chain in which five propylene monomer units are successively meso-bonded, in the polypropylene molecular chain as measured by the method disclosed by A. Zambelli et al. in Macromolecules, 6, 925 (1973), namely by use of $^{13}$C-NMR. However, the assignment of NMR absorption peak was determined according to the method described in Macromolecules, 8, 687 (1975) published thereafter. Specifically, the isotactic pentad fraction was measured as an area fraction of mmmm peak in the total absorption peak in the methyl carbon region of $^{13}$C-NMR spectrum. Measurement was carried out by use of AM400 available from BRUKER.

(4) Flexural Modulus (Unit: MPa)

Flexural modulus was measured according to the method provided in JIS K7203. The measurement was carried out at a load speed of 2.5 m mm/m and a measuring temperature of 23° C. using an injection-molded specimen having a thickness of 6.4 mm and a span length of 100 mm.

(5) Tensile Strength

Tensile strength was measured according to the method provided in ASTM D638. The measurement was carried out by using injection-molded specimens 3.2 mm in thickness. The tensile speed was 50 mm/min. Yield strength (unit: MPa), strength at break (unit: MPa) and elongation at break (%) were evaluated. The measuring temperature was 23° C.

(6) Izod Impact Strength (Unit: KJ/m$^2$)

Measurement was carried out according to the method provided in JIS K 7110. Used were injection-molded specimens having a thickness of 6.4 mm and having a notch resulting from notching after molding. The measuring temperature was 23° C. or −20° C.

(7) Rockwell Hardness

Rockwell hardness was measured according to the method provided in JIS K7202. The measurement was carried out by use of injection molded specimens 3.0 mm in thickness. The measurements obtained were indicated in R scale.

(8) Impact Strength (Falling Weight Impact Strength: FWI) (Unit: Kg·cm)

The shape of a weight used in the measurement is shown in FIG. 1. The impact energy consumed when 50% of the number of test pieces tested rupture was determined in the measurement method provided in JIS K7211 except using an iron weight having the shape shown in FIG. 1.

Injection molded pieces were used as specimens. Specifically, several pieces of long plate-like specimens having a size MD×TD×thickness=400 mm×100 mm×3 mm were molded. Each of the specimens was divided into five equal parts along the TD direction (that is, each divided piece is a long plate a size of MD×TD=80 mm×100 mm) and the central three pieces were used as test pieces.

(9) Thermal Aging Resistance (Unit: Hour)

Evaluation was carried out according to JIS K7212 [General rules for tests for thermal aging properties of thermoplastics in the form of sheet by means of ovens]. Measurement was carried out at 150° C. using a gear oven available from Toyo Seiki Seisaku-Sho, Ltd. The time until a specimen (press molded sheet 1 mm in thickness) was deteriorated completely, in other words, until the tensile strength became zero was measured.

The press molded sheet was prepared by heating and melting a material at 230° C. for 10 minutes and cooling at 30° C. for 5 minutes.

(Preparation of Injection Moldings)

Specimens (injection moldings) for the evaluations of the physical properties was prepared according to the following method.

The specimens were obtained by performing injection molding at a molding temperature of 230° C. and a mold cooling temperature of 50° C. by use of an injection molding machine, NEOMAT Model 350/120 available from Sumitomo Heavy Industries, Ltd.

Example 1

To 100 parts by weight of a polypropylene resin (propylene-ethylene block copolymer: A-1), 0.01 part by weight of hydrotalcite (B-1), 0.025 part by weight of Sumilizer GA80 (C-1), 0.05 part by weight of ULTRANOX 626 (C-2), 0.05 part by weight of Sumilizer TPM (C-3) and 0.1 part by weight of sodium benzoate (D-1) were blended and mixed in advance with a Henschel mixer for five minutes. The resulting mixture was heated and melt kneaded in a single screw extruder having an inner diameter of 40 mm (available from Tanabe Manufacturing Co. Ltd.) at a set temperature of 230° C. and a rotation speed of 100 rpm to form pellets. The pellets had an MFR of 9 g/10 minutes. Using the pellets, evaluations of physical properties were carried out according to the method described above. The measurements were carried out after conditioning for 72 hours at 23° C. after molding. The results are shown in Table 1.

Example 2

The operations were carried out in the same method as that described in Example 1 except that the sodium benzoate (D-1) used in Example 1 was changed to (D-2). The results are shown in Table 1.

Comparative Example 1

The operations were carried out in the same method as that described in Example 1 except that the sodium benzoate (D-1) used in Example 1 was changed to (D-3). The results are shown in Table 1.

TABLE 1

| Item | | | Unit | Example 1 | Example 2 | Comparative Example 1 |
|---|---|---|---|---|---|---|
| Composition | A-1 | | part by weight | 100 | 100 | 100 |
| | D-1 | | part by weight | 0.1 | | |
| | D-2 | | part by weight | | 0.1 | |
| | D-3 | | part by weight | | | 0.1 |
| Properties of composition | | | | | | |
| MFR | 230° C. | | g/10 min | 9 | 9 | 9 |
| Density | 23° C. | | g/cm$^3$ | 0.902 | 0.902 | 0.902 |
| Tensile property | 23° C. | Yield strength | MPa | 29 | 29 | 29 |
| | | Strength at break | MPa | 14 | 17 | 16 |
| | | Elongation at break | % | 440 | 500 | 500 |
| Flexural property | 23° C. | Flexural modulus | MPa | 1400 | 1400 | 1400 |
| | | Flexural strength | MPa | 36 | 37 | 37 |
| Izod impact strength Notched | 23° C. | | KJ/m$^2$ | 9 | 9 | 8 |
| | −20° C. | | KJ/m$^2$ | 4 | 4 | 4 |
| Hardness | 23° C. | | — | 97 | 96 | 96 |
| FWI | −30° C. | | Kg · m | 54 | 58 | 40 |

Examples 3 and 4

Using the pellets produced by the methods described in Examples 1 and 2, press sheets (1 mm thick) were produced wherein one sheet was from the pellets of Example 1 and the other was from the pellets of Example 2. The sheets were subjected to thermal aging resistance tests. The results are shown in Table 2.

Comparative Example 2

Pellets were produced in the same method as that used in Example 1 except that the hydrotalcite (B-1) used in Example 1 was changed to 0.05 part by weight of Calcium Stearate S (B-2) and the sodium benzoate (D-1) was changed to 0.1 part by weight of aluminum para-tert-butylbenzoate (E-1). Using the pellets, a press sheet (1 mm thick) was prepared. This sheet was subjected to a thermal aging resistance test. The result is shown in Table 2.

TABLE 2

| Item | | Unit | Example 3 | Example 4 | Comparative Example 2 |
|---|---|---|---|---|---|
| Composition | A-1 | part by weight | 100 | 100 | 100 |
| | B-1 | part by weight | 0.01 | 0.01 | |
| | B-2 | part by weight | | | 0.05 |
| | D-1 | part by weight | 0.1 | | |
| | D-2 | part by weight | | 0.1 | |
| | E-1 | part by weight | | | 0.1 |
| Thermal aging resistance (150° C.) | | hour | 2000 | 2000 | 800 |

It is clear that in Examples 1–4, which satisfy the requirements of the present invention, products were obtained which are excellent in balance between rigidity and impact resistance and also excellent in thermal aging resistance in their long time use.

On the other hand, it is clear that in Comparative Example 1, which does not satisfy a requirement of the present invention, namely, the requirement that particles having particle diameters of not less than 10 μm account for less than 15% by weight, the impact resistance is poor, whereas in Comparative Example 2, which does not satisfy requirements of the present invention, namely, the requirement that particles of sodium benzoate have an average particle diameter of from 0.1 to 3.75 μm and the requirement that particles having particle diameters of not less than 10 μm account for less than 15% by weight, the thermal aging resistance is poor.

As described in detail above, according to the present invention, a polypropylene resin composition superior in balance between rigidity and impact resistance and also in thermal aging resistance in its long time use and a formed article comprising the same can be obtained.

What is claimed is:

1. A polypropylene resin composition comprising (A) 100 parts by weight of polypropylene resin and the following components (B) to (D):
   (B) from 0.001 to 0.1 part by weight of an inorganic neutralizing agent,
   (C) from 0.01 to 5 parts by weight of an antioxidant, and
   (D) from 0.01 to 0.5 part by weight of particles of sodium benzoate having an average particle diameter, as measured by a laser method, of from 0.1 to 3.75 μm wherein particles having particle diameters of not less than 10 μm account for less than 15% by weight,
   wherein the antioxidant (C) is an antioxidant comprising a phosphorus antioxidant, a sulfur antioxidant and a phenol antioxidant.

2. The polypropylene resin composition according to claim 1, wherein the polypropylene resin (A) is a propylene-based copolymer having a melt flow rate (MFR), as measured at 230° C., of from 0.01 to 200 g/10 minutes.

3. The polypropylene resin composition according to claim 1, wherein the inorganic neutralizing agent (B) is a hydrotalcite.

4. A formed article comprising the polypropylene resin composition according to any one of claims 1 to 3.

* * * * *